United States Patent [19]

Ban

[11] Patent Number: 4,711,576
[45] Date of Patent: Dec. 8, 1987

[54] WAVE FRONT ABERRATION MEASURING APPARATUS

[75] Inventor: Mikichi Ban, Yokohama, Japan

[73] Assignee: Canon Kabushiki Kaisha, Tokyo, Japan

[21] Appl. No.: 825,596

[22] Filed: Feb. 3, 1986

[30] Foreign Application Priority Data

Feb. 4, 1985 [JP] Japan .................................. 60-19443

[51] Int. Cl.$^4$ .............................................. G01B 9/02
[52] U.S. Cl. ..................................... 356/353; 356/359
[58] Field of Search ......................... 356/353, 359, 360

[56] References Cited

U.S. PATENT DOCUMENTS 4,575,248  3/1986  Horwitz et al. ................. 356/359 X

OTHER PUBLICATIONS

Murty, "A Compact Radial Shearing Interferometer Based on the Law of Refraction", *Applied Optics*, vol. 3, No. 7, pp. 853–857, 7/64.

Steel, *Interferometry*, Cambridge University Press, p. 27, 1983.

*Primary Examiner*—Davis L. Willis
*Assistant Examiner*—Matthew W. Koren
*Attorney, Agent, or Firm*—Fitzpatrick, Cella, Harper & Scinto

[57] ABSTRACT

A wave front aberration measuring apparatus comprises light splitter for splitting a light beam to be measured into a first light beam and a second light beam, a first converter for deflecting the first beam by 180° and laterally displacing the advancing direction thereof, a second converter for deflecting the second beam by 180° and laterally displacing the advancing direction thereof, an interference fringe former for superposing the first and second beams guided by the first and second converters to form interference fringes and an interference fringe observing device for measuring or observing the state of the interference fringes obtained by the interference fringe former to discriminate the state of the wave front of the light beam to be measured from the state of the interference fringes, wherein at least one of the first and second converters is rendered movable with respect to the light splitter.

15 Claims, 4 Drawing Figures

WAVE FRONT ABERRATION MEASURING APPARATUS

BACKGROUND OF THE INVENTION

1. Field of the Invention

The present invention relates to an interferometer for measuring wave front aberration, and in particular to such apparatus adapted for evaluating the performance of an optical head for a compact disk as a signal reading device, by measuring the status of wave front of a light beam emitted by such optical head at photoelectric information reading.

2. Description of the Prior Art

Among interferometers for measuring the state the wave front of a light beam emitted by an optical apparatus, there is already known a so-called Machzender interferometer of a structure as shown in FIG. 1. In FIG. 1 there are provided an optical apparatus to be measured, having a light source and an optical system therein and emitting a light beam; a collimating lens 3 for converting a light beam, emitted by said apparatus 1, into a flat wave; beam splitters 4, 5; mirrors 6, 7; a beam expander 8 for increasing the diameter of the incident beam; a glass plate 9 for compensating the difference in optical path lengths of two beams split by the beam splitter 4; a density filter 10 for balancing, by attenuation, the intensities of two beams split by the beam splitter 4; and an interference fringe observing system. In said interferometer, a light beam passing through the beam splitter 4 is expanded by the beam expander 8 to form a reference wave front. On the other hand, a light beam reflected by the beam splitter 4 is adjusted to have an intensity and an optical path length, by the density filter 10 and the glass plate 9, same as those of the reference wave front, thus forming a so-called object wave front. Said reference wave front and said object wave front are superposed by the beam splitter 5 to generate interference fringes, which are observed through the observing system 11. The state, or wave front aberration, of the light beam emitted by the apparatus 1 to be measured can be determined by the measurement of the state of thus generated interference fringes.

However such interferometer is associated with drawbacks of requiring a fine adjustment of the thickness of the glass plate 9 for matching the optical path lengths of the reference wave front 12 and the object wave front 13, and of poor adjustability and stability because changes in angles of the beam splitters 4, 5 and of the mirrors 6, 7 readily give rise to a change in the number of interference fringes. Such phenomena are encountered not only in the above-explained interferometer but also in various other interferometers.

SUMMARY OF THE INVENTION

An object of the present invention is to provide a wave front aberration measuring apparatus capable of easily and stably measuring the state of the wave front of a light beam emitted by an optical equipment.

Particularly an object of the present invention is to provide a wave front aberration measuring apparatus which facilitates, in the measurement of the aberration of a wave front, formed by a light beam emitted by an optical equipment, by splitting said light beam into two beams to form a reference wave front and an object wave front and observing interference fringes formed by said wave fronts, the matching of the optical path lengths of said two light beams and enables a stable measurement of the interference fringes.

The foregoing object can be achieved, according to the present invention, by a wave front aberration measuring apparatus comprising light splitting means for splitting a light beam to be measured into a first light beam and a second light beam; first converting means for deflecting said first beam by 180° and laterally displacing the advancing direction thereof; second converting means for deflecting said second beam by 180° and laterally displacing the advancing direction thereof; interference fringe forming means for superposing said first and second beams guided by said first and second converting means to form interference fringes; and interference fringe observing means for measuring or observing the state of the interference fringes obtained by said interference fringe forming means to discriminate the state of the wave front of the light beam to be measured from the state of said interference fringes, wherein at least one of said first and second converting means is rendered movable with respect to said light splitting means.

DETAILED DESCRIPTION OF THE PREFERRED EMBODIMENT

Figure 2:
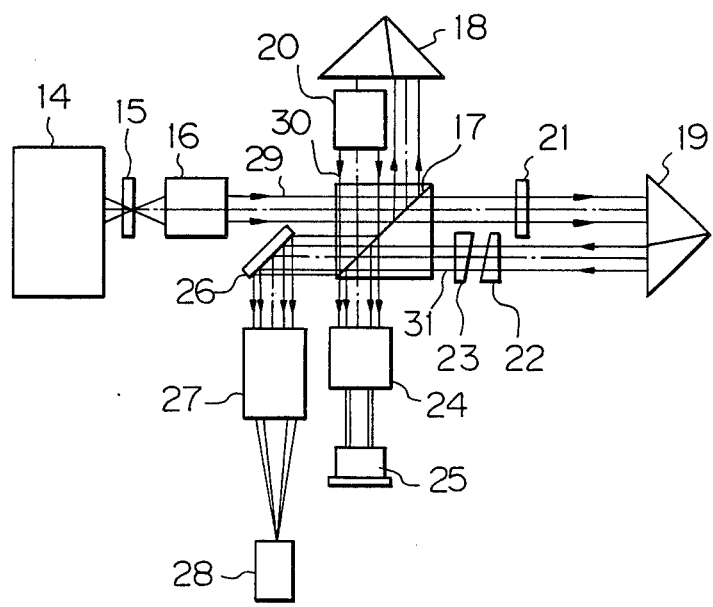
FIG. 2 is a schematic view of an optical system constituting an embodiment of the wave front aberration measuring apparatus of the present invention.

FIG. 2 is a schematic view of an optical system constituting an embodiment of the present invention, wherein 14 indicates an optical equipment forming a wave front to be measured, such as an optical head for a compact disk, which will be hereinafter called a CD head. A glass or plastic plate 15 for correcting the aberration for obtaining a wave front from the CD head 14, in the same state as in reading the information provided on a bottom face of a glass substrate with the CD head. Optical means 16, composed for example of a collimating lens, functions to convert the wave front to be measured into a plane wave front. There are also provided a beam splitter 17 for driving the light beam into two beams; first and second converting means 18, 19 which deflect the light beams by 180° and laterally displace said beams, and which are composed of corner cubes in the present embodiment; reference wave front forming means 20, composed, in the present embodiment, of a beam expander for increasing the diameter of the incident beam; a density filter 21 for light intensity attenuation; optical wedges 22, 23 which can be rotated with respect to each other for inclining the direction of the incident wave front; an imaging optical system 24; a collimating lens 27; image sensors 25, 28; and a mirror 26.

The present embodiment is formed as an improvement on the so-called Twyman-Green interferometer, for measuring the state of the wave front of a light beam emitted by the CD head 14 and transmitted by the glass plate 15.

The wave front to be measured of the light beam, emitted by the CD head 14 and transmitted by the glass plate 15, is converted into a plane wave front by the collimator 16, and the light beam having said plane wave front 29 is split into two beams by the beam splitter 17. A beam having said plane wave front, reflected by the beam splitter 17, is deflected by 180° and laterally displaced by the corner cube 18. Then the beam expander 20 expands the diameter of the beam to widen an area substantially free from aberration, thereby reducing the aberration of the wave front of an area to be overlapped with the other of said two light beams and thus forming a reference wave front 30. On the other hand, in order to sharpen the finally obtained interference fringes, the light beam having said plane wave front transmitted by the beam splitter 17 is attenuated by the density filter 21 to an intensity substantially equal to that of the aforementioned reference wave front 30, and is deflected by 180° and laterally displaced by the corner cube 19. Then a suitable rotation of the optical wedges 22, 23 about the optical axis adjusts the optical path through an inclination of the plane wave front with respect to the optical axis, thus forming a so-called object wave front having a determined relative angle to the reference wave front, capable of forming interference fringes therebetween.

Then the reference and object wave fronts are guided to the beam splitter 17 and overlapped, and a part of the thus overlapped wave fronts is guided to an observation system, having the imaging optical system and the image sensor 25 and constituting a part of the interference fringe forming means, while another part of said overlapped wave fronts is guided to an alignment system having the collimating lens 27 and the image sensor 28.

In said observation system, the interference fringes formed by the reference wave front 30 and the object wave front 31 are focused on the image sensor 25 through the imaging optical system 24, for the measurement of the state of said interference fringes or for the display and observation thereof on a television monitor. In this manner the the state of wave front of the light beam emitted by the CD head 14 can be measured. The alignment system is used for detecting an error in the position of the CD head 14. If the CD head 14 is in a correct mounting position, in the optical system of the present embodiment, the position of the spot of the light beam focused by the CD head remains conjugate with that on the image sensor 28. On the other hand, if the CD head 14 is axially displaced from the determined position, the reference and object wave fronts do not converge to a spot on the image sensor 28 but form a circle of a finite size. On the other hand, if the CD head 14 is displaced in a direction perpendicular to the optical axis, both wave fronts converge, on the image sensor 28, as spots which however do not coincide each other and are both out of the center of the image sensor. In the present embodiment, the position of the CD head can be regulated by observing the state of said spots for example on a television monitor.

In the present embodiment the alignment optical system may be dispensed with and a part of the observation system may be utilized also for alignment.

In further relation to the alignment, it is also possible to determine the size of the spot and the displacement thereof from the determined position through the use of a CCD or the like as the image sensor 28 and through an image processing, thereby obtaining corresponding electrical signals, and to feed said signals to a movable mount supporting the optical equipment to be measured, thereby achieving position control. An auto-aligning function can be easily added in this manner.

Also in an optical system as shown in FIG. 2, the beam splitter 17, merely divided the light intensity, generally provides an excess light beam, which however is effectively utilized for alignment in the present embodiment.

In the present embodiment, the adjustment of the optical path lengths of the reference wave front 30 and the object wave front 31 is achieved by fine axial movements of the corner cube 18 and/or 19. A satisfactory matching of the optical path lengths can be achieved without a change in the number of interference fringes, since the corner cube always reflects the light in a constant state even if said cube is skewed at the fine adjustment. In this manner a state having the highest contract in the interference fringes can be easily identified. Also the use of the corner cube eliminates the conventional adjustment of the optical path length by changing the thickness of the glass plate.

Besides, the use of two corner cubes as shown in the present embodiment allows the inclination adjusting mechanisms to be dispensed with at the positions of the beam splitter 17 and the corner cubes 18, 19, thus providing an interferometer of an entirely simplified structure and a satisfactory stability.

Figure 3:
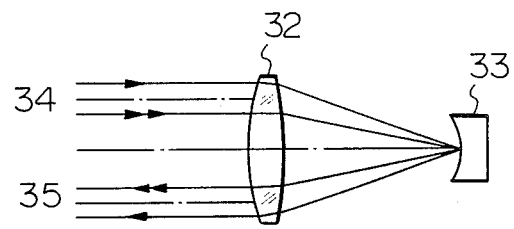
FIG. 3 is a schematic view showing another embodiment of the light beam converting means shown in FIG. 2.

In the present embodiment, the corner cubes, employed as the first and second converting means for deflection of 180° and lateral displacement of the incident light beams, may be replaced by a so-called cat's eye optical system composed, as shown in FIG. 3, of a lens 32 and reflector means 33 consisting of a flat or curved mirror positioned at the focal point of said lens 32.

In said cat's eye optical system, an incident light beam 34 of an arbitrary height above the optical axis of the lens 32 is guided by said lens 32, then reflected by the reflector means 33, again guided to the lens 32 and emerges therefrom as a beam 35 of a height symmetrical to the incident beam with respect to the optical axis of the lens 32. Also in said cat's eye optical system, the emerging beam obtained by refraction, reflection and refraction remains parallel to the incident beam, even if the lens 32 and the reflector means 33 are integrally skewed to the optical axis. For this purpose the reflector means 33 has a determined curved surface as shown in FIG. 3. However the reflector means 33 of said cat's eye optical system may be composed of a simple planar mirror if a mechanism for moving a support member for the above-mentioned optical components has a sufficiently high precision so that the inclination of said optical components is negligible.

Also the alignment, or positional adjustment of the optical equipment to be measured, with respect to the apparatus of the present invention can be achieved by the observation of the interference fringes through the observation system (imaging optical system 24 and image sensor 25), instead of the alignment system (mirror 26, collimating lens 27 and image sensor 28) shown in FIG. 2. For example, if the laser beam is defocused by an axial displacement of the optical equipment 14, the image magnification of the entire system is substantially changed, and the state of the interference fringes is significantly different from that in the focused state, since plane wave fronts are not received. A similar situation occurs when the optical equipment is displaced in a direction perpendicular to the optical axis or is inclined thereto. A finer measurement can therefore be expected if the optical equipment 14 is set by the information obtainable from the observation system as well as the information from the alignment system.

Figure 1:
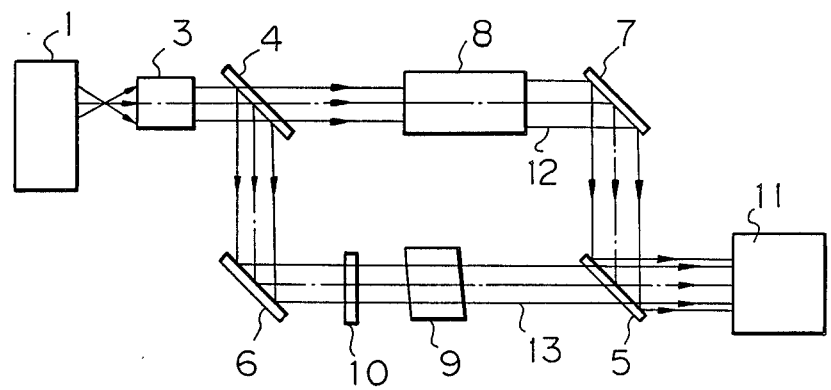
FIG. 1 is a schematic view of a Machzender interferometer constituting an example of the conventional wave front aberration measuring apparatus.

As explained in the foregoing, the aberration measuring apparatus of the present invention enables an easy matching of the optical path lengths of the reference and object wave fronts through the use of corner cubes or cat's eye optical system. A semiconductor laser is commonly employed as the light source for the recent compactization of not only optical disk equipment but also laser beam printers or the like. In such equipment, however, a part of the laser beam from such semiconductor laser is reflected, in certain optical systems, back to said semiconductor laser for example by a beam splitter, and again reflected to the light-emitting face of said laser, thus being introduced again into the optical system and causing interference with the normally introduced beam. In order to avoid such drawback it is proposed to employ a semiconductor laser with a short interferable range for example in the CD head, and the apparatus of the present invention is adequate for measuring the wave front aberration of an optical equipment provided with such semiconductor laser of a short interferable range. The observation of interference fringes is possible without precise matching of the optical path lengths, in case of employing laser beams of a long interferable range, but, for laser beams with a short interferable range, a conventional apparatus as shown in FIG. 1 requires a cumbersome procedure for precise matching of the optical path lengths. On the other hand, the wave front aberration measuring apparatus of the present invention can meet a strict requirement as explained above, since the optical path length can be substantially adjusted by a fine movement of the corner cube or the lire.

Figure 4:
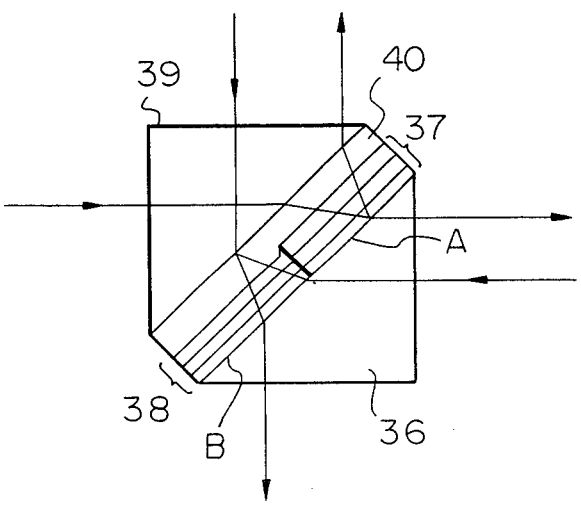
FIG. 4 is a schematic view showing another embodiment of the light beam splitting means shown in FIG. 2.

Also the beam splitter 17 employed in the present embodiment may be replaced by a half mirror with controlled reflectance. For example, if the beam diameter of the reference wave front 30 shown in FIG. 2 is increased by $\alpha$ times by the beam expander 20, the illumination intensity of said reference wave front is reduced to $1/\alpha^2$. In order to improve the contrast of the interference fringes, the intensities of the reference wave front 30 and the object wave front 31 are preferably equal. Thus, it is possible to avoid the light loss in the density filter, by forming a half-reflecting layer 37 with a ratio of reflection transmission is $\alpha^2/1$ on an upper half A on the diagonal face of a rectangular prism 36 as shown in FIG. 4, forming a similar layer 38 with a ratio of reflection to transmission is 1/1 on a lower half B on said diagonal face, and adhering said prism with another rectangular prism 39 with an adhesive material 40.

In the present embodiment, the beam splitter 17 may be separated respectively for dividing the plane wave 29 and for superposing the reference wave front 30 and the object wave front 31. It is also possible to form interference fringes, instead of two optical wedges 22, 23, by tilting the wave front at the CD head, namely by tilting the optical equipment to be measured. In the present embodiment, highly precise observation of the interference fringes may be achieved by a fringe scanning interference method, introduced for example in a periodical "O plus E", Nov. 1983, p. 70, published by Shin-gijutus Communications, and in "Optical shop Testing", p. 409, 1977, Wiley and Sons. This fringe scanning interference method can be effectively utilized by providing the corner cube with an axially adjustable piezoelectric element, employing a solid-state image sensor such as MOS or CCD as the image sensor 25, and utilizing a computer for photoelectric signal reading.

The foregoing embodiment has been explained in reference to a case of the wave front aberration of a laser beam in a CD head, but the apparatus of the present invention is applicable also to various other apparatus. Naturally the collimating lens shown in FIG. 2 can be dispensed with, if the measured beam is a parallel beam with a plane wave front. Also the embodiment as shown in FIG. 2 or the variation of individual component as shown in FIGS. 3 and 4 is not limitative but can assume various modes of realizations within the concept of the present invention.

As explained in the foregoing, the present invention provides a wave front aberration measuring apparatus capable, at the observation of the state of a wave front emitted by an optical equipment to be measured, easy adjustment of the optical path lengths of the reference wave front and the object wave front while still allowing stable measurement of the interference fringes, through the use of converting means such as corner cubes or a cat's eye optical system in a part of the interference system.

Particularly, according to the present invention, a simple and stable system for measuring the wave front aberration can be realized, stating from Twyman-Green interferometer. The apparatus of the present invention allows precise and easy measurement of the state of wave front regardless of the interferable distance of the light beam to be measured, and is extremely useful for evaluating an optical pickup or the like.

What I claim is:

1. A wave front aberration measuring apparatus comprising:

beam splitting means for splitting a light beam to be measured into a first beam and a second beam;

first converting means for deflecting a travel direction of said first beam by 180° and laterally displacing said first beam, said first converting means being able to be displaced along said travel direction for controlling the optical path length of said first beam;

second converting means for deflecting a travel direction of said second beam by 180° and laterally displacing said second beam;

a beam expander otpical system disposed in the optical path of one of said first and second beams for forming an expanded beam from said one beam to obtain a reference wave front;

interference fringe forming means for superposing the first and second beams guided by said first and second converting means to form interference fringes; and interference fringe observing means for observing the state of the interference fringes obtained by said expanded beam and the other beam of said first and second beam to measure the state of wave front of the light beam to be measured, from the state of said interference fringes.

2. An apparatus according to claim 1, wherein at least one of said first and second converting means is composed of a corner cube.

3. An apparatus according to claim 1, wherein at least one of said first and second converting means is composed of a lens and a mirror positioned in the vicinity of the focal point of said lens.

4. An apparatus according to claim 1, further comprising an optical member disposed in the optical path of said the other beam for adjusting an inclnation of the wave front of said the other beam.

5. An apparatus according to claim 4, wherein said optical member is composed of plural optical wedges.

6. An apparatus according to claim 1, wherein said light beam splitting means and said interference fringe forming means include means common to both.

7. An apparatus according to claim 1, further comprising filter means provided in the optical path of said other beam for attenuating the light amount of said other beam.

8. An interferometer for measuring a wave front aberration, comprising:
   means for splitting a light beam to be measured into a first beam and a second beam and directing said first and second beam to predetermined directions, respectively;
   first optical means for directing said first beam to a direction opposite to said predetermined direction of said first beam with laterally displacing the optical path of said first beam;
   second optical means for directing said second beam to a direction opposite to said predetermined direction of said second beam with laterally displacing the optical path of said second beam;
   a beam expander disposed in the optical path of said first beam for expanding a beam diameter of said first beam; and
   means for superposing the first beam expanded by said beam expander and the second beam to form interference fringes, thereby obtaining a wave front aberration of the beam to be measured by measuring said interference fringes.

9. An interferometer according to claim 8, wherein said first and second optical means consist of corner cubes, respectively, and at least one of said corner cubes is movable along said predetermined direction.

10. An interferometer according to claim 8, further comprising filter means provided in the optical path of said second beam for attenuating the light amount of said second beam.

11. An interferometer according to claim 10, further comprising means for adjusting an inclination of the wave front of said second beam, said adjusting means being provided in the optical path of said second beam.

12. An interferometer according to claim 8, wherein said splitting means effects the splitting into said first and second beams with a ratio of intensity being $\alpha^2:1$ and said beam expander expands the beam diameter of said first beam at $\alpha$ times.

13. A wave front aberration measuring apparatus comprising:
   lens means for converting a light beam to be measured into a parallel beam;
   means for splitting the parallel beam into a first beam and second beam and directing said first and second beams to predetermined directions, respectively;
   first optical means for directing said first beam to a direction opposite to said predetermined direction of said first beam with laterally displacing the optical path of said first beam;
   second optical means for directing said second beam to a direction opposite to said predetermined direction of said second beam with laterally displacing the optical path of said second beam;
   a beam expander disposed in the optical path of said first beam for expanding a beam diameter of said first beam;
   means for superposing the first beam expanded by said beam expander and the second beam to form interference fringes; and
   means for observing the interference fringes so as to measure the wave front aberration of the beam to be measured.

14. An apparatus according to claim 13, further comprising monitor means for observing a condensed state of the light to be measured.

15. An apparatus according to claim 14, wherein said monitor means includes an optical system for condensing at least part of the first and second beams superposed by said interference fringe forming means, on a predetermined image plane, and photoelectric conversion means disposed on said predetermined image plane, the condensed state of the light to be measured being observed based on an output signal from said conversion means.

* * * * *

UNITED STATES PATENT AND TRADEMARK OFFICE
CERTIFICATE OF CORRECTION

PATENT NO. : 4,711,576
DATED : December 8, 1987
INVENTOR(S) : MIKICHI BAN

It is certified that error appears in the above-identified patent and that said Letters Patent is hereby corrected as shown below:

Column 1, line 16, "state the" should read --state of the--.

Column 3, line 42, "manner" should read --manner,--; same line, "of wave" should read --of the wave--;

line 56, "coincide each" should read --coincide with each--.

Column 7, line 21, "beam" should read --beams--;

line 25, "with" should read --and--;

line 29, "with" should read --and--.

Column 8, line 20, "with" should read --and--;

line 24, "with" should read --a--

Signed and Sealed this

Third Day of May, 1988

*Attest:*

DONALD J. QUIGG

*Attesting Officer*  *Commissioner of Patents and Trademarks*